:::
(12) United States Patent
Wheeler et al.

(10) Patent No.: US 9,563,627 B1
(45) Date of Patent: Feb. 7, 2017

(54) CONTEXTUAL DETERMINATION OF RELATED MEDIA CONTENT

(75) Inventors: Aaron Joseph Wheeler, San Francisco, CA (US); Kathryn Bush, San Francisco, CA (US)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 13/611,720

(22) Filed: Sep. 12, 2012

(51) Int. Cl.
*G06F 17/30* (2006.01)

(52) U.S. Cl.
CPC ......... *G06F 17/30* (2013.01); *G06F 17/30914* (2013.01)

(58) Field of Classification Search
USPC .................................. 707/749, 766
See application file for complete search history.

(56) References Cited

U.S. PATENT DOCUMENTS

| | | | | |
|---|---|---|---|---|
| 6,633,868 B1 * | 10/2003 | Min | ................ | G06F 17/30864 |
| 6,792,406 B1 * | 9/2004 | Fujimura | ................ | A63F 13/12 704/257 |
| 6,886,010 B2 * | 4/2005 | Kostoff | ............ | G06F 17/30705 |
| 7,089,226 B1 * | 8/2006 | Dumais | ............ | G06F 17/30705 707/740 |
| 7,613,687 B2 * | 11/2009 | Nye | ................... | G06F 17/30705 |
| 2003/0217052 A1 * | 11/2003 | Rubenczyk | ....... | G06F 17/30643 |
| 2009/0119256 A1 * | 5/2009 | Waters | ................ | H04L 41/5064 |
| 2009/0164271 A1 * | 6/2009 | Johnson | ............... | G06Q 20/123 705/344 |
| 2009/0199115 A1 * | 8/2009 | Singh | ................ | G06F 17/30864 715/764 |
| 2010/0036830 A1 * | 2/2010 | Lee | .................. | G06F 17/30967 707/708 |
| 2011/0239103 A1 * | 9/2011 | Mercuri | ........... | G06F 17/30861 715/234 |
| 2012/0036213 A1 * | 2/2012 | Tiu, Jr. | .............. | G06F 17/30569 709/206 |
| 2012/0317123 A1 * | 12/2012 | Green | ............... | G06F 17/30867 707/748 |
| 2013/0073388 A1 * | 3/2013 | Heath | .................. | G06Q 50/01 705/14.53 |

* cited by examiner

*Primary Examiner* — Hosain Alam
*Assistant Examiner* — Ahmed Abraham
(74) *Attorney, Agent, or Firm* — Byrne Poh LLP

(57) ABSTRACT

This disclosure relates to contextual determination of related media content. A referral source identification component determines a referral source associated with a request for media content, and a determination component determines a set of context data for the request based in part on the referral source. A contextual suggestion component identifies or selects a set of additional content based in part on a subset of the context data, and suggests or recommends a subset of the additional content to a user based on a set of recommendation criteria.

22 Claims, 10 Drawing Sheets

CONTEXTUAL DETERMINATION OF RELATED MEDIA CONTENT

TECHNICAL FIELD

This disclosure generally relates to systems and methods that facilitate contextual determination of related media content.

BACKGROUND

The Internet and media enabled portable computing devices have dramatically altered the processes for generating and consuming media content. Presently, users can consume media content virtually anywhere at any time, as long as they have access to a media capable device with an Internet connection. The convenience of being able to view media content via the Internet, essentially on demand, has resulted in explosive growth of Internet media consumption. Internet media traffic is currently approaching a majority of consumer Internet traffic, and the rate of demand is projected to continue increasing.

The sheer quantity of media content available to users can make targeting relevant related content for consumption challenging. Millions of people around the world have the capability to produce media content, and popular online services can receive tens of hours worth of newly uploaded user-generated content every minute. In addition, traditional media outlets now have the ability to enable consumers to access archives containing large amounts of older media content, along with newly generated content. Due in part to the large amounts of media content available, online services may have difficulty selecting relevant media content related to content consumed by a user.

A technique that has been commonly employed by online services to determine related content includes identifying related content based on attributes of previously consumed media content. However, different attributes may have varying degrees of usefulness for identifying related content based on user context. For instance, a user consuming media content in a first context may find related content based on a set of shared attributes very useful; however, another user consuming the media content in a different context may not find the same related content desirable or relevant.

SUMMARY

According to an aspect of the subject disclosure, systems and methods for contextual determination of related media content are disclosed. A referral source identification component determines a referral source associated with a request for media content, and a determination component determines a set of context data for the request based in part on the referral source. A contextual suggestion component identifies or selects a set of additional content based in part on a subset of the context data, and suggests or recommends a subset of the additional content to a user based on a set of recommendation criteria.

In one example, a determination component determines a set of context data for a request associated with content consumed by a user, and a contextual suggestion component suggests a set of additional content to the user based at least in part on a subset of context data. The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
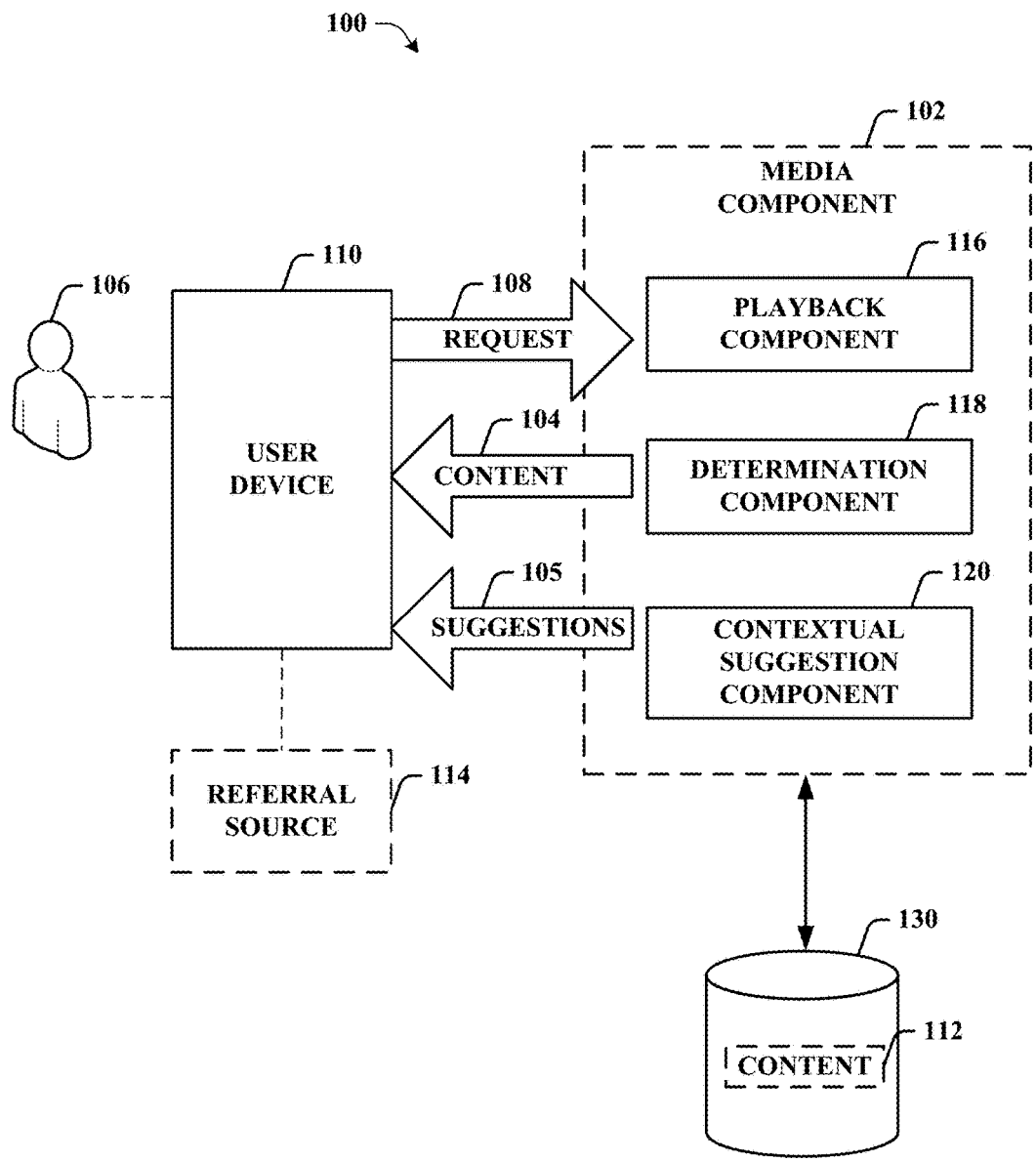
FIG. 1 illustrates an example system for contextual determination of related media content in accordance with various aspects described in this disclosure.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that the subject matter can be practiced without these specific details. In other instances, well-known structures and devices are shown in block diagram form in order to facilitate describing the subject matter.

It is to be appreciated that in accordance with one or more implementations described in this disclosure, in the instance where users consent in advance to the use of such data, data associated with the user may be used for contextual determinations of related media content. Moreover, one or more implementations described herein can provide for anonymizing collected, received, or transmitted data.

One non-limiting implementation of this disclosure provides for accurate and efficient contextual determination of related media content. More particularly, in accordance with an implementation, determination component determines a set of context data for a request associated with content consumed by a user, and a contextual suggestion component suggests a set of additional content to the user based at least in part on a subset of context data.

Non-Limiting Examples of Systems for Contextual Determination of Related Media Content Turning now to FIG. 1, illustrated is an example system 100 for contextual determination of related media content in accordance with various aspects described in this disclosure. Generally, system 100 can include a memory that stores computer executable components and a processor that executes computer executable components stored in the memory, examples of which can be found with reference to FIG. 10. System 100 includes a media component 102. The media component 102 publishes, streams, or otherwise provides media content 104 (consumed media content 104 or consumed content 104) to a user 106. For example, in one implementation, in response to a request 108 received from the user 106, the media component 102 provides content included in a set of content 112 to a user device 110 associated with the user 106 via a network connection. The request 108 initiates, directs, or otherwise requests playback of specified media content. The content 112 can include but is not limited to videos, music, electronic books (e-books), video games, websites, and/or articles. The user device 110 can include but is not limited to a smart phone, a cell phone, a personal digital assistant (PDA), a tablet, a laptop, a desktop, a portable music player, a video game system, an electronic reader (e-reader), a global positioning system (GPS), a set-top box, a digital video recorder (DVR), a digital media receiver, and/or a television (e.g., an internet enabled television). The media component 102 includes a playback component 116, a determination component 118, and a contextual suggestion component 120. It is to be appreciated that although the media component 102 is illustrated as being a stand-alone component, such implementation is not so limited. For example, the media component 102 can be included in a content server, a user device (e.g., user device 110), a multimedia player, and so forth.

The playback component 116 provides for display, presentation, or what is referred to for the purposes of this disclosure as playback of the consumed content 104 via the user device 110. For example, in one implementation, the user 106 is referred to an internet video (e.g., content 104) via a referral source 114, and the playback component 116 provides for displaying the streaming internet video to the user device 110. Aspects of the invention are not limited to a particular display of the consumed content 104, and the display can be adapted based on the user device 110 and/or content 104. It is to be appreciated that although the set of content 112 is illustrated as being included in a data store 130, such implementation is not so limited. For example, the set of content 112 can be included in the media component 102, the user device 110, and/or in another location, wherein the media component 102 may access the set of media content 112, e.g., via a network connection.

The determination component 118 inspects, examines, or otherwise analyzes the request 108 obtained, acquired, or otherwise received from the user 106, and determines, based on the analysis, a set of contextually relevant data (context data) for the request 108. The set of context data characterizes, defines, or otherwise indicates a set of circumstances, characteristics, or conditions associated with the request 108, generation of the request 108, and/or consumption of the content 104. For example, the set of context data can include but is not limited to an identity of the referral source 114, a type of the referral source 114, a type of a referral, and/or a set of consumption characteristics. For instance, the determination component 118 can analyze the request 108, and determine, based on the analysis, that the request 108 is associated with (e.g., resulted from) a set of hyperlinks (e.g. type of referral) provided via a first social networking website (e.g., identity of referral source and type referral source) (discussed in greater detail with reference to FIGS. 2-3).

The contextual suggestion component 120 (suggestion component 120) identifies, selects, or otherwise determines a set of additional content based in part on a subset of the context data, and suggests, recommends, or otherwise provides a subset of the additional content (suggestions 105) to the user 106. For example, in one implementation, the contextual suggestion component 120 selects a set of additional content related to and/or associated with the subset of context data. For instance, the set of context data for the request 108 can include a first type of referral source (e.g., a first website), and a first type of referral (e.g., embedded content in the first website). The contextual suggestion component 120 can select content included in the set of content 112 related to the first type of referral source (e.g., the website), and/or the first type of referral (e.g., additional embedded content). It is to be appreciated that although the determination component 118 and suggestion component 120 are illustrated as being included in the media component 102, such implementation is not so limited. For example, the determination component 118 and/or suggestion component 120 can be included in a content server, a user device (e.g., user device 110), and/or different locations wherein the media component 102 may access the determination component 118 and/or suggestion component 120, e.g., via a network connection.

Figure 2:
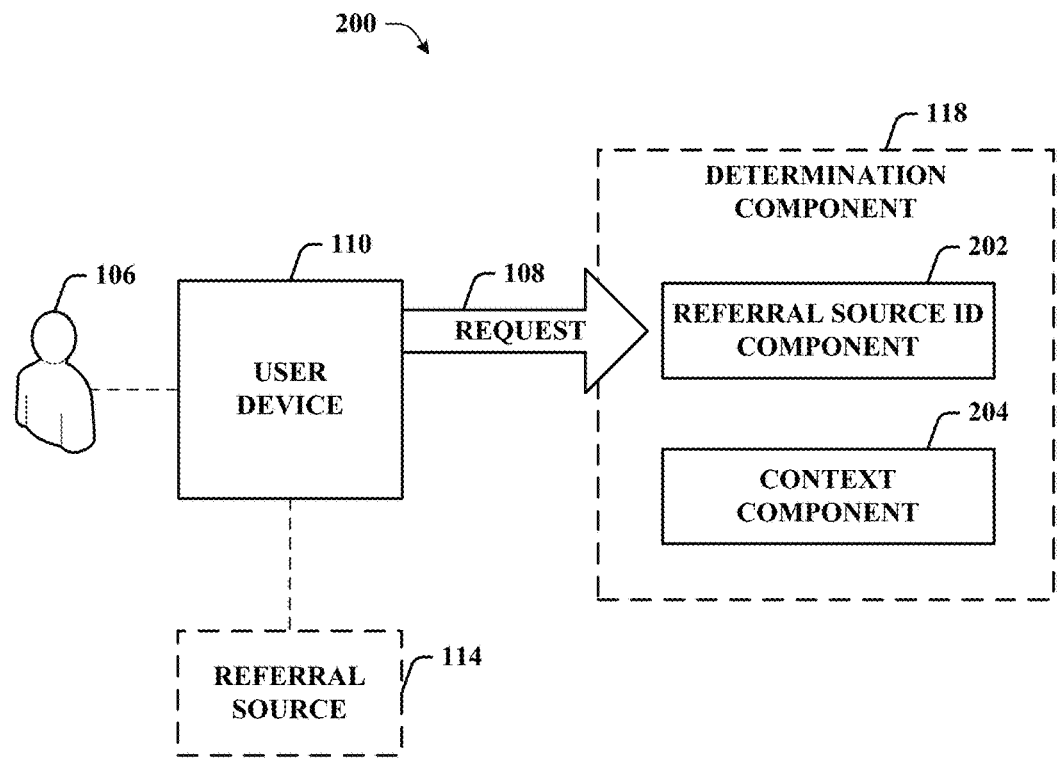
FIG. 2 illustrates an example determination component in accordance with various aspects described in this disclosure.

FIG. 2 illustrates an example determination component 118 in accordance with various aspects described in this disclosure. As discussed, the determination component 118 identifies, ascertains, or otherwise determines a set of context data for a request 108. The determination component 118 in FIG. 2 includes a referral source identification component 202, and a context component 204. The referral source identification component 202 (id component 202) determines an identity of the referral source 114. The referral source 114 can include but is not limited to a website (e.g., search engine, internet email provider, social network, etc.), an application (e.g., instant messenger, a media player, electronic reader, etc.), and/or a different user device. For example, in one implementation, a Hypertext Transfer Protocol (HTTP) referrer is included in a header associated with the request 108, and the id component 202 inspects the header, and determines the identity of the referral source 114 based on the HTTP referrer. As an additional or alternative example, in one implementation, the id component 202 inspects session information associated with a request 108, and determines the identity of the referral source based on the session information. It is to be appreciated that although the referral source 114 is illustrated as a single referral such implementation is not so limited. For example, the referral source 114 can include multiple instances of a referral source 114. For instance, the referral source 114 can include an email conversation thread containing a set of emails from disparate parties. As an additional or alternative example, the referral source can include a set of referral sources. For instance, the referral source 114 can include a set of search engine results (e.g., a first referral source) provided via an electronic reader (e.g., a second referral source).

The context component 204 determines a set of context data for the request 108 based in part on the identity of the referral source 114 (e.g., determined using the id component 202). As discussed, the set of context data for the request 108 can include but is not limited to an identity of the referral source 114, a type of the referral source 114, a type of referral, and/or a set of consumption characteristics. For instance, the type of referral source can include but is not limited to a search engine, an email, a webpage, a social network, an application, and/or a device. The type of referral can include but is not limited to a set of hyperlinks, a set of embedded content, and/or a set of search results. The set of consumption characteristics can include but is not limited to a type of device employed to consume the content (e.g., device 106), a set of devices associated with the user, a time of consumption, a geographic location of the user (e.g., using GPS data, etc.), a set of user inputs (e.g., implicit or explicit), a proximity to other devices, and/or a proximity to a set of other users. For example, where the identity of the referral source 114 includes an identity (e.g., web address, etc.) of a search engine, the context component 204 determines a type of referral includes a set of search engine results. As an additional or alternative example, in one implementation, the context component 204 crawls, examines, or otherwise inspects the referral source 114, and determines, based in part on the inspection, the subset of context data. For instance, the context component 204 can inspect a web address (e.g., identity of the referral source 114) or data associated with the web address (e.g., source code, metadata, etc.), and determine, based on the inspection, that a type of referral includes a set of hyperlinks, and a type of the referral source 114 includes a webpage.

Figure 3:
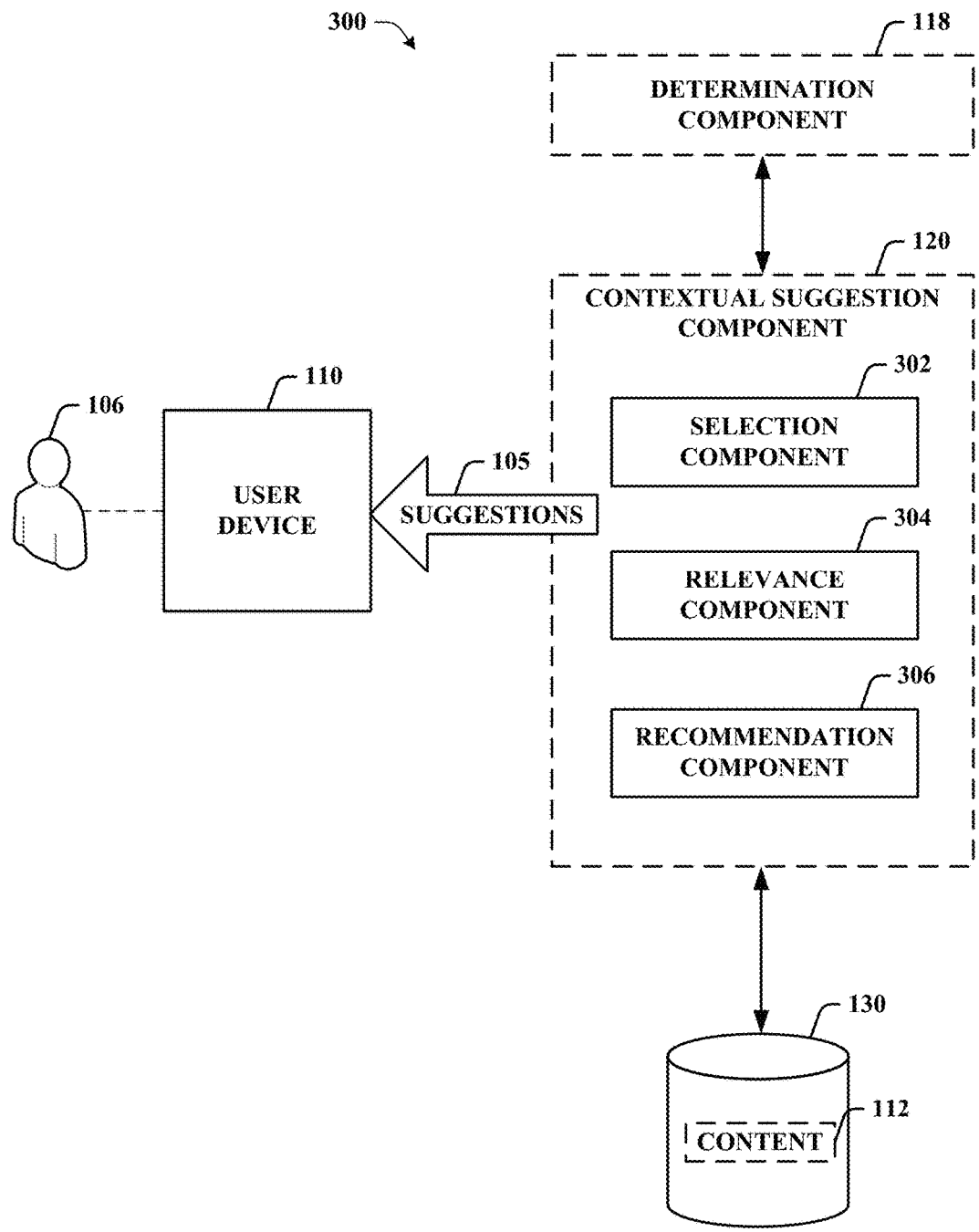
FIG. 3 illustrates an example contextual suggestion component in accordance with various aspects described in this disclosure.

FIG. 3 illustrates an example contextual suggestion component 120 in accordance with various aspects described in this disclosure. As discussed, the contextual suggestion component 120 (suggestion component 120) identifies, determines, or otherwise selects a set of additional content based in part on a subset of context data for a request (e.g., request 108). The set of context data can include but is not limited to an identity of a referral source, a type of a referral source, a type of referral, and/or a set of consumption characteristics. The suggestion component 120 in FIG. 3 includes a selection component 302, a relevance component 304, and a recommendation component 306.

The selection component 302 identifies, determines, or otherwise selects a set of additional content in the set of content 112 based in part on the subset of the context data. For example, in one implementation, where a type of referral in the set of context data includes a set of search engine results, the selection component 302 selects additional content in the set of content 112 corresponding to a subset of the search engine results. As an additional or alternative example, in one implementation, where an identity of a referral source includes another user associated with the user 106 (associated user), the selection component 302 selects content included in the set of content 112 that corresponds to content consumed and/or referred by the associated user and/or a set of related or similar users. As another additional or alternative example, in one implementation, where a type of a referral includes embedded content, and a type of the referral source includes a webpage, the selection component 302 selects additional content included in the set of content 112 corresponding to a subset of the content embedded in the webpage, a related webpage, and/or a similar webpage.

The relevance component 304 determines relevance of content included in the set of additional content to a user (e.g., user 106). For example, in one implementation, the relevance component 304 characterizes, rates, or otherwise ranks the additional content selected by the selection component 302 based on a set of ranking criteria. The set of ranking criteria can include but is not limited to a similarity score, a set of user preferences, and/or a set of collaborative filtering criteria. For example, in one implementation, the relevance component 304 can rank respective content in the set of additional content by comparing the additional content against the consumed content and determining, based on the comparison, respective similarity scores for the additional content. For instance, a first video having a first similarity score can be ranked greater than or ahead of a second video having a second similarity score, where the first similarity score is greater than the second similarity score.

The recommendation component 306 suggests, provides, or otherwise recommends a subset of the additional content (suggestions 105) to the user 106 based on a set of recommendation criteria. The recommendation criteria can include but is not limited to having a ranking that satisfies a predetermined ranking threshold (e.g., top 5, top 10, etc.). The recommendation component 306 recommends the subset of additional content to the user 106 during playback of the consumed content 104, and/or in a post-play section associated with the consumed content. Aspects of the invention are not limited to techniques for providing recommendations to the user 106. The recommendations can be adapted based on the user device 110, the consumed content 104, and/or the user 106.

Figure 4:
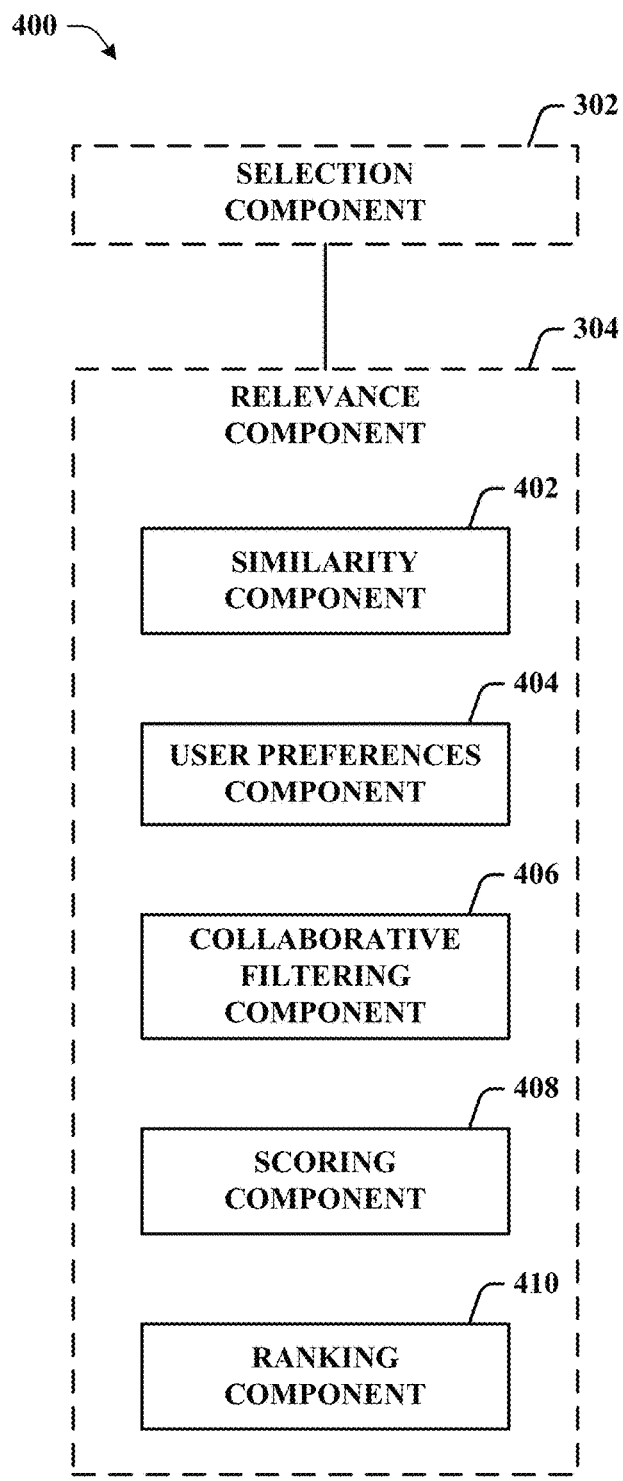
FIG. 4 illustrates an example relevance component in accordance with various aspects described in this disclosure.

Referring to FIG. 4, illustrated is an example relevance component 304 in accordance with various aspects described herein. As discussed, the relevance component 304 determines relevance of content included in the set of additional content to a user (e.g., user 106). For example, the relevance component 304 categorizes, rates, or otherwise ranks additional content (e.g., selected using the selection component 302) based on a set of ranking criteria. The relevance component 304 in FIG. 4 includes a similarity component 402, a user preferences component 404, a collaborative filtering component 406, a scoring component 408, and a ranking component 410. The similarity component 402 analyzes, inspects, or otherwise compares a set of attributes associated with respective content included in the set of additional content against a set of attributes of consumed content (e.g., consumed content 104), and, based on the comparison, generates, calculates, or otherwise determines respective similarity scores (e.g., ranking, rating, etc.) for the additional content. For example, in one implementation, the similarity component 402 compares metadata associated with the additional content against metadata associated with the consumed content, and determines, based on the comparison, respective similarity scores for the additional content. The metadata can include, for example, a title, a set of user comments (e.g., social network comments, etc.), a description, a user rating, a set of restrictions (e.g., age, account, etc.), etc.

The user preferences component 404 categorizes, ranks, or otherwise scores (user preferences score) respective content included in the set of additional content based on a set of user preferences. The set of user preferences can be expressly generated by a user (e.g., via user input, question and answer, selections, etc.), and/or dynamically determined or inferred based in part on behavior of the user and/or similar or related users (consumption patterns, search history, etc.). For instance, a user preference for a first type of content can be determined based on whether the user consumes the first type of content a quantity of times satisfying a favorites threshold. If the user consumes the first type of content a quantity of times satisfying the preference threshold, then the first type of content can be added to a favorites list associated with the user. Content corresponding to content types included in the favorites list can be scored greater than content not corresponding to content types included in the favorites list.

The collaborative filtering component 406 categorizes, ranks, or otherwise scores (collaborative filtering score) respective content included in the set of additional content based on a set of collaborative filtering criteria. The collaborative filtering criteria can include but is not limited to user ratings/rankings, a quantity or percentage of users that save or add the content to a favorites list, a quantity or percentage of users that share (e.g., post, status, blog, etc.) the content, a category or classification of the content, a location of the device and/or a quantity or percentage of users that consume the content.

The scoring component 408 categorizes, sorts, or otherwise scores (relevance score) content included in the set of additional content based in part on the similarity score, user preferences score, and/or collaborative filtering score for the content. For example, in one implementation, the scoring component 408 combines, averages, or otherwise aggregates a similarity score, a user preferences score, and a collaborative filtering score for a first video. The ranking component 410 ranks respective content included in the set of additional content as based in part on the relevance score (relevance score ranking). For example, in one implementation, the suggestion component 120 provides a subset of the additional content to the user 106 having satisfying a relevance score ranking threshold (e.g., top 5, top 10, etc.).

Figure 5:
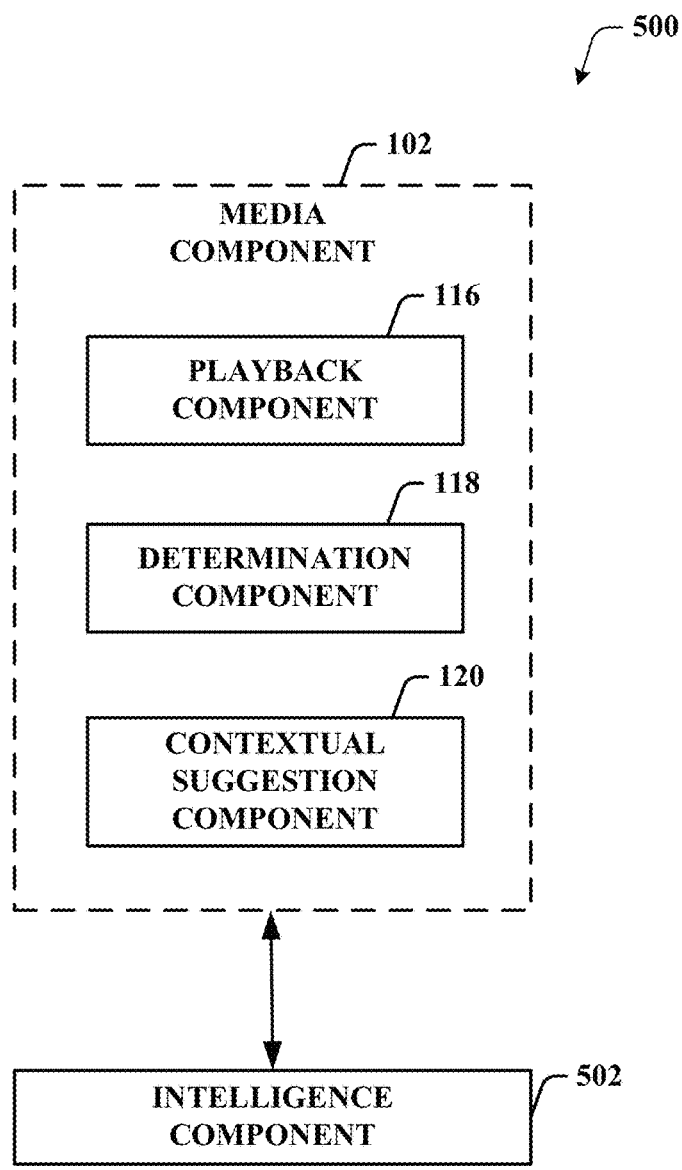
FIG. 5 illustrates an example system for contextual determination of related media content in accordance with various aspects described in this disclosure.

FIG. 5 illustrates an example system 500 that employs an intelligence component 502 that facilitates contextual determination of related media content in accordance with various aspects described in this disclosure. For example, all or portions of the media component 102, determination component 118, and/or contextual suggestion component 120 are operatively coupled to intelligence component 502. Additionally or alternatively, all or portions of intelligence component 502 may be included in one or more components described in this disclosure. The intelligence component 502 can provide for or aid in various inferences or determinations. For example, in one implementation, the intelligence component 502 facilitates inferring additional content related to a set of context data for a request (e.g., request 108). As discussed, the contextual suggestion component 120 selects a set of additional content based in part on a subset of the context data. In one implementation, the intelligence component 502 can infer or determine the subset of context data to employ for selecting the additional content.

Accordingly, in order to provide for or aid in the numerous inferences described in this disclosure, intelligence component 502 examines the entirety or a subset of the data available and provides for reasoning about or infer states of the system, environment, client, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is used to develop models of priority.

Figure 6:
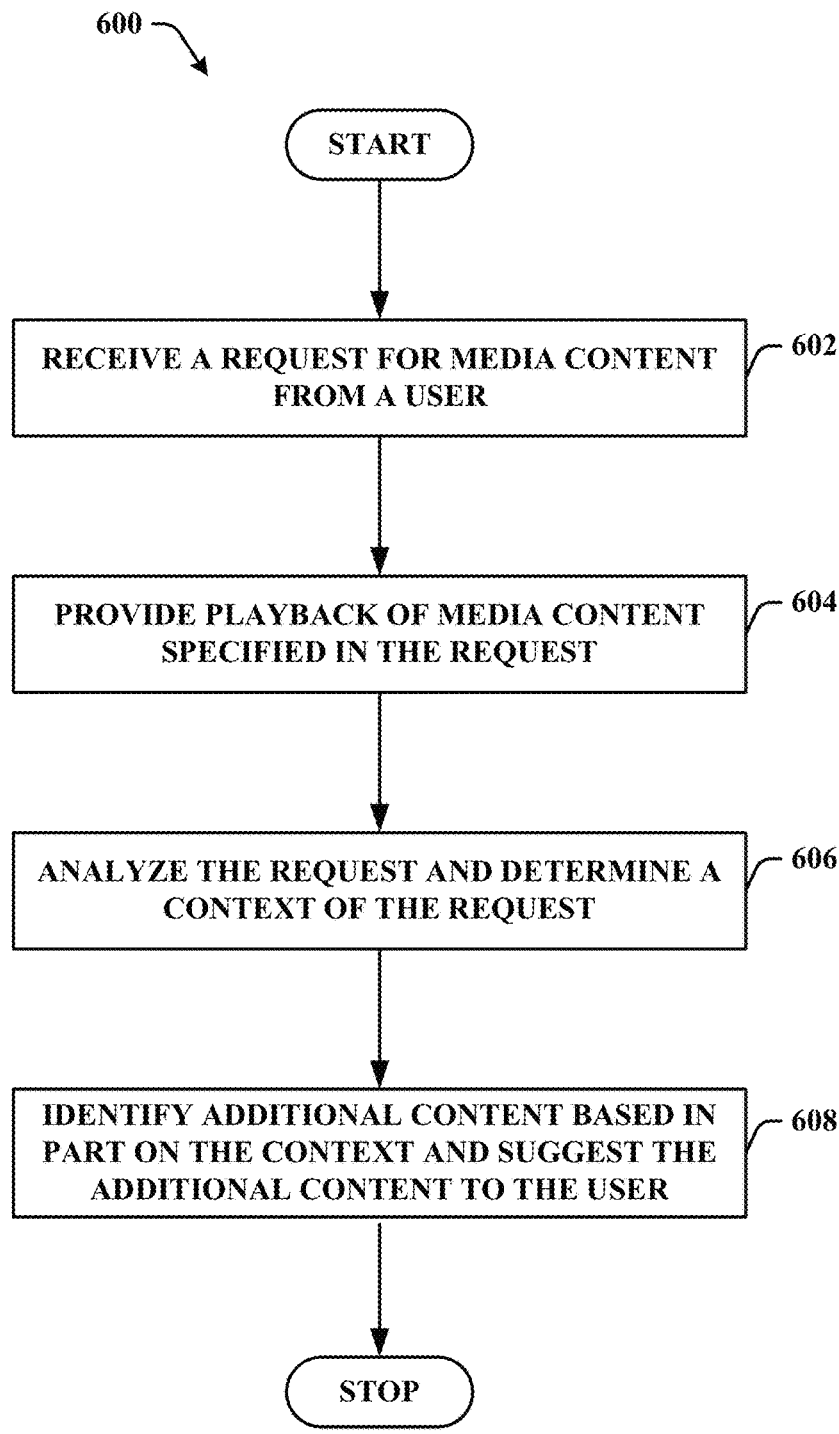
FIGS. 6-8 are example flow diagrams of respective methodologies for contextual determination of related media content in accordance with various aspects described herein.
Figure 7:
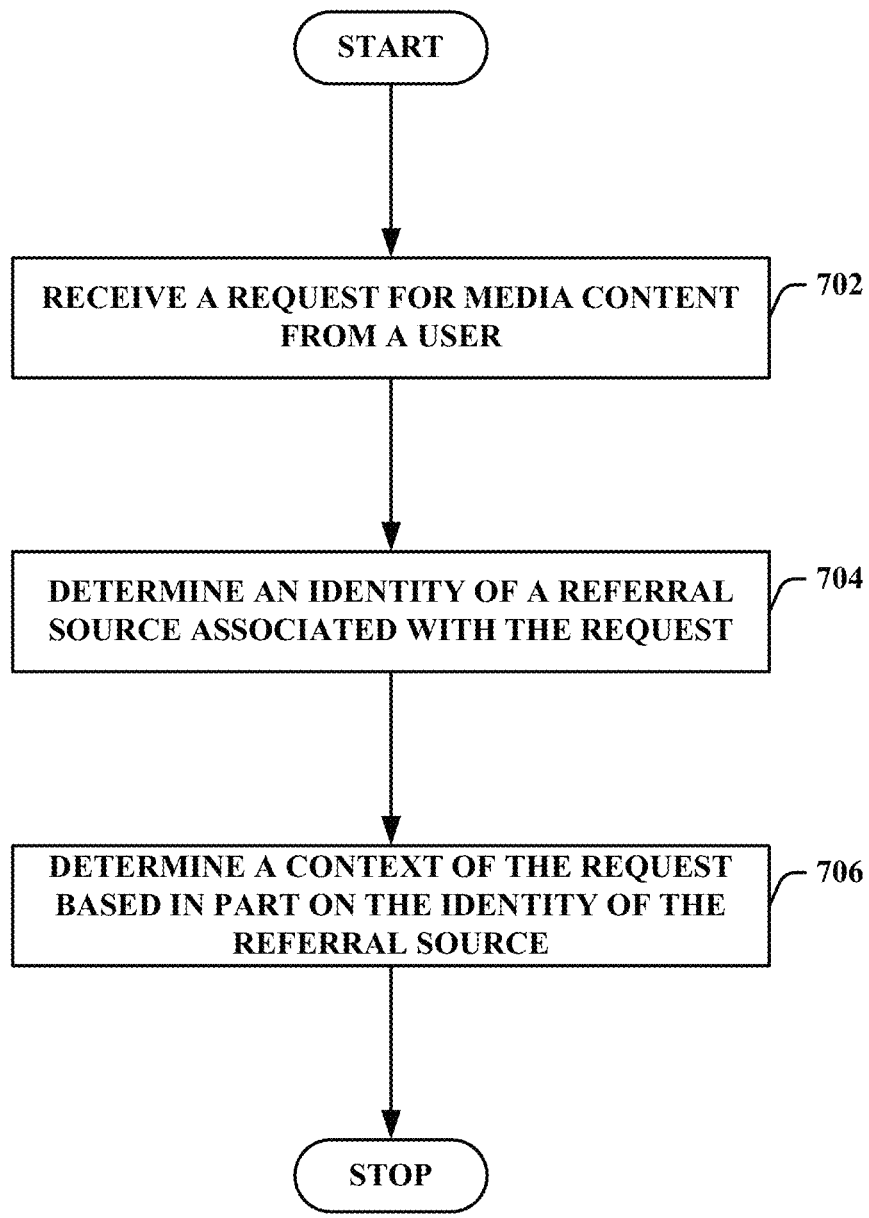
Figure 8:
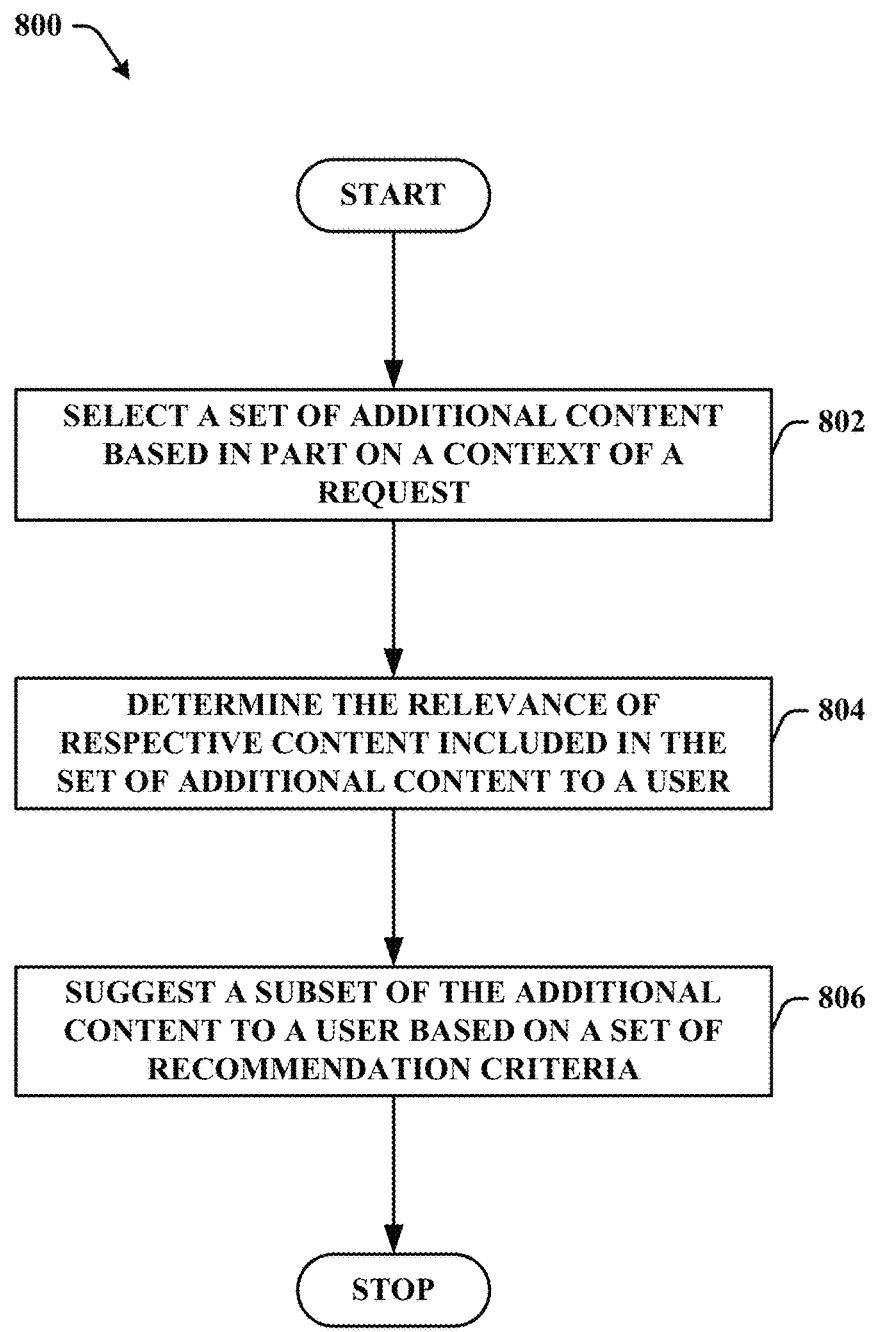

Non-Limiting Examples of Methods for Contextual Determination of Related Media Content FIGS. 6-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, illustrated is an example methodology 600 for contextual determination of related media content in accordance with various aspects described in this disclosure. At reference numeral 602, a request for media content is received from a user (e.g., using the media component 102). For example, in one implementation, a request is received from a user device associated with the user via a network connection. The request initiates, directs, or otherwise requests playback of specified media content. The media content can include but is not limited to videos, music, electronic books (e-books), video games, websites, and/or articles. The user device can include but is not limited to a smart phone, a cell phone, a personal digital assistant (PDA), a tablet, a laptop, a desktop, a portable music player, a video game system, an electronic reader (e-reader), a global positioning system (GPS), a set-top box, digital video recorder (DVR), digital media receiver, and/or a television (e.g., an internet enabled television).

At reference numeral 604, playback of the media content specified in the request is provided (e.g., using the playback component 116). For example, in one implementation, a request specifies an internet video, and the internet video is streamed to the user device associated with the user. Aspects of the invention are not limited to a particular display of media content, and the display can be adapted based on the user device and/or content. At reference numeral 606, the request is analyzed, and a set of context data for the request is determined based on the analysis (e.g., using the determination component 118). The set of context data can include but is not limited to an identity of a referral source, a type of referral source, a type of referral, and/or a set of consumption characteristics.

At reference numeral 608, additional content is identified based in part on a subset of the context data (e.g., using the contextual suggestion component 120), and the additional content is suggested to the user. For instance, where the set of context data includes a first type of referral, and first referral source, additional content corresponding and/or related to the first type of referral and/or first referral source can be identified and suggested to the user.

FIG. 7 illustrates an example methodology 700 for contextual determination of related media content in accordance with various aspects described in this disclosure. At reference numeral 702, a request for media content is received from a user (e.g., using the media component 102). For example, in one implementation, a request is received from a user device associated with the user via a network connection. The request initiates, directs, or otherwise requests playback of specified media content. As discussed, the media content can include but is not limited to videos, music, electronic books (e-books), video games, websites, and/or articles. The user device can include but is not limited to a smart phone, a cell phone, a personal digital assistant (PDA), a tablet, a laptop, a desktop, a portable music player, a video game system, an electronic reader (e-reader), a global positioning system (GPS), a set-top box, a digital video recorder (DVR), a digital media receiver, and/or a television (e.g., an internet enabled television).

At reference numeral 704, an identity of a referral source associated with the request is determined (e.g., using the referral source identification component 202). For example, in one implementation, a Hypertext Transfer Protocol (HTTP) referrer is included in a header associated with the request, and the identity of the referral source is determined based on the HTTP referrer. As an additional or alternative example, in one implementation, session information associated with the request is inspected, and the identity of the referral source is determined based on the session information.

At reference numeral 706, a set of context data for the request is determined based in part on the identity of the referral source (e.g., using the context component 204). As discussed, the set of context data characterizes, defines, or otherwise indicates a set of circumstances, causes, or conditions associated with the request and/or the generation of the request. For example, the set of context data for the request can include but is not limited to the identity of the referral source, a type of referral source, a type of referral, and/or a set of consumption characteristics. For instance, the type of referral source can include but is not limited to a search engine, an email, a webpage, a social network, an application, and/or a device. The type of referral can include but is not limited to a set of hyperlinks, a set of embedded content, and/or a set of search results. The set of consumption characteristics can includes but is not limited to a type of device employed to consume the content (e.g., device 106), a set of devices associated with the user, a time of consumption, a geographic location of the user, a proximity to other devices, and/or a proximity to a set of other users. For example, where the identity of the referral source includes a first search engine, a type of referral can be determined to include a set of search engine results. As an additional or alternative example, a web address (e.g., identity of the referral source) is inspected (e.g., crawled, etc.), and a set of context data is determined based on the inspection. For instance, the web address and/or data associated with the web address (e.g., source code, metadata, etc.) can be inspected, and based on the inspection, a referral type can be determined (e.g., a set of links), and a type of referral source can be determined (e.g., a webpage).

Turning to FIG. 8, illustrated is an example methodology 800 for contextual determination of related media content in accordance with various aspects described in this disclosure. At reference numeral 802, a subset of content (e.g., additional content) is identified, determined, or otherwise selected, from a set of content, based in part on a subset of context data (e.g., using the selection component 302). For example, in one implementation, where a type of referral included in the set of context data includes a set of search engine results, a subset of content corresponding to a subset of the search engine results is selected. As an additional or alternative example, in one implementation, where an identity of a referral source includes another user associated with the user (associated user), a subset of content that corresponds to content consumed and/or referred by the associated user and/or a set of related or similar users is selected. As still another additional or alternative example, in one implementation, where a type of referral includes embedded content, and a type of referral source includes a webpage, a subset of content corresponding to a subset of content embedded in the webpage, a related webpage, and/or a similar webpage is selected.

At reference numeral 804, relevance, to the user, of respective content included in the set of additional content is determined (e.g., using the relevance component 304). For example, in one implementation, respective content in the set of additional content is characterized, graded, or otherwise ranked based on a set of ranking criteria. The set of ranking criteria can include but is not limited to a similarity score, a set of user preferences, and/or a set of collaborative filtering criteria. For example, in one implementation, content included in the set of additional content is ranked by comparing the content against the consumed content and determining, based on the comparison, a similarity score for the content. A first video having a first similarity score can be ranked greater than or ahead of a second video having a second similarity score, where the first similarity score is greater than the second similarity score.

At reference numeral 806, a subset of the additional content is suggested to the user based on a set of recommendation criteria (e.g., using the recommendation component 306). The recommendation criteria can include but is not limited to having a ranking that satisfies a predetermined ranking threshold (e.g., top 5, top 10, etc.). The subset of additional content is suggested to the user 106 during playback of consumed content, and/or in a post-play section for consumed content. The aspects discussed above are not limited to techniques for providing recommendations to the user. For example, the recommendations can be adapted based on a user device, consumed content, and/or the user.

Exemplary Networked and Distributed Environments

One of ordinary skill in the art can appreciate that the various implementations described herein can be implemented in connection with any computer or other client or server device, which can be deployed as part of a computer network or in a distributed computing environment, and can be connected to any kind of data store where media may be found. In this regard, the various implementations described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various implementations of this disclosure.

Figure 9:
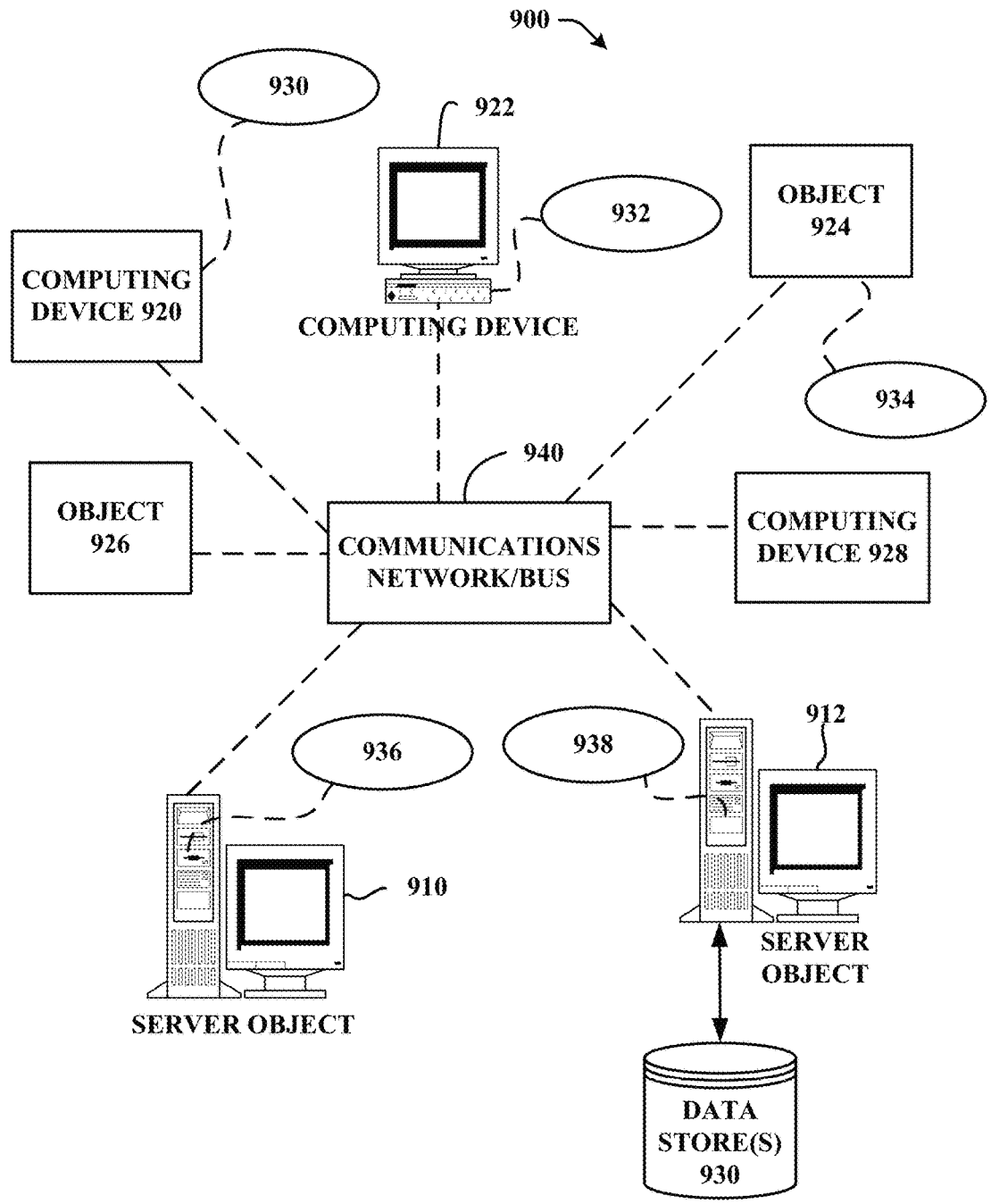
FIG. 9 is a block diagram representing an exemplary non-limiting networked environment in which the various implementations can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as to smart phones, cell phones, personal digital assistants (PDAs), tablets, laptops, desktops, portable music players, video game systems, electronic readers (e-readers), a global positioning systems (GPS), set-top boxes, televisions, etc. For instance, the applications 930, 932, 934, 939, 938 can include the playback component 116, the determination component 118, and/or contextual suggestion component 120.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of the various implementations of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various implementations.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described herein can be applied to any device suitable for implementing various implementations described herein. Handheld, portable and other computing devices and computing objects of all kinds are contemplated for use in connection with the various implementations, e.g., anywhere that a device may wish to read or write transactions from or to a data store. Accordingly, the below general purpose remote computer described below in FIG. 10 is but one example of a computing device.

Although not required, implementations can partly be implemented via an operating system, for use by a developer of services for a device or object, and/or included within application software that operates to perform one or more functional aspects of the various implementations described herein. Software may be described in the general set of context data for computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
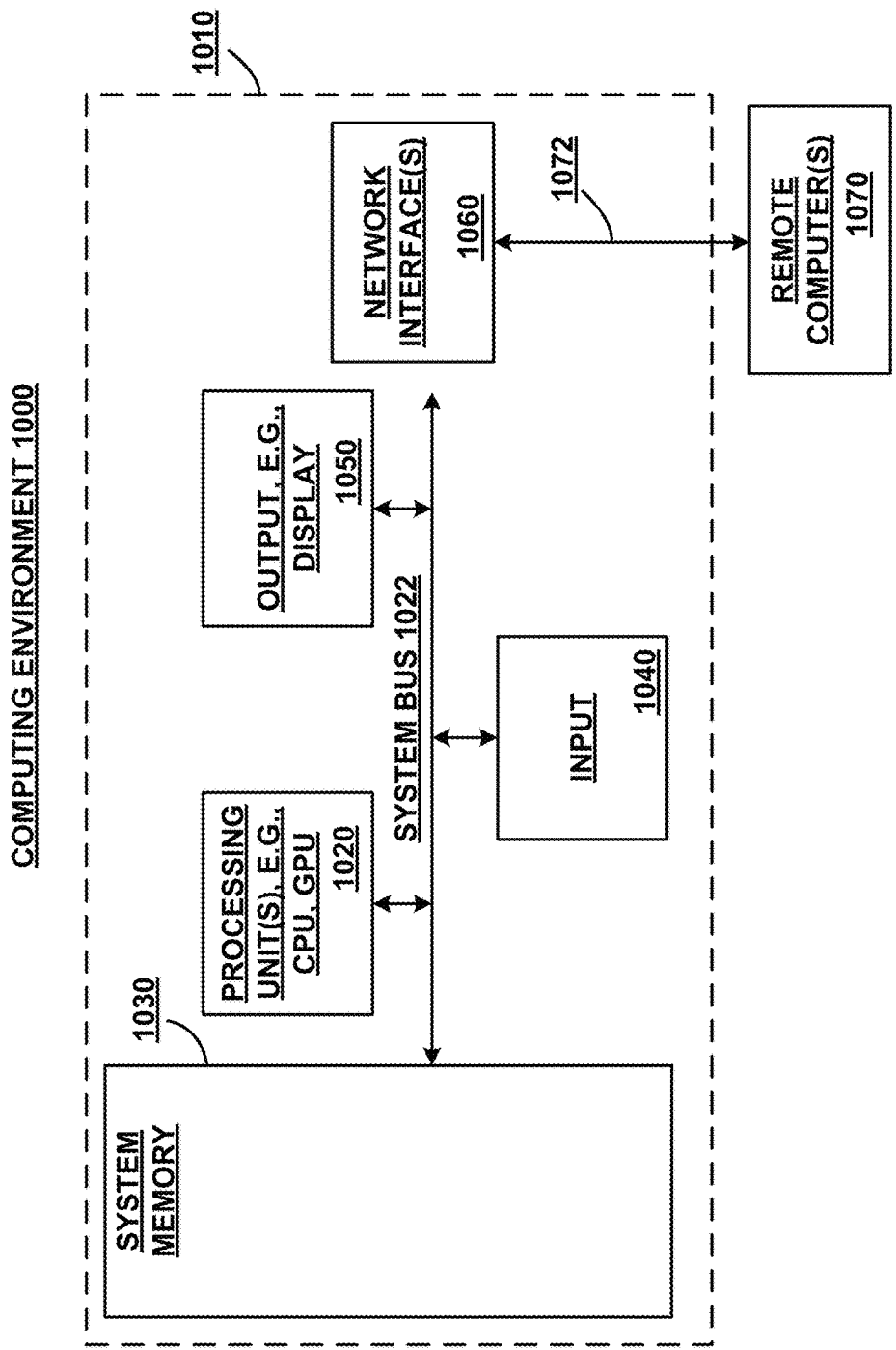
FIG. 10 is a block diagram representing an exemplary non-limiting computing system or operating environment in which the various implementations may be implemented.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020. It is to be appreciated that the computer 1010 can be used in connection with implementing one or more of the systems or components shown and described in connection with FIGS. 1-5. For instance, the computer 1010 can include a media component 102, a user device 110, and/or a referral source 114. In addition, the computer 1010 can include different networked devices, such as smart phones, cell phones, personal digital assistants (PDAs), tablets, laptops, desktops, portable music players, video game systems, electronic readers (e-readers), global positioning systems (GPS), set-top boxes, televisions, etc.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary implementations have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various implementations described herein, it is to be understood that other similar implementations can be used or modifications and additions can be made to the described implementation(s) for performing the same or equivalent function of the corresponding implementation(s) without deviating there from. Still further, multiple processing chips or multiple devices can share the performance of one or more functions described herein, and similarly, storage can be effected across a plurality of devices. Accordingly, the invention is not to be limited to any single implementation, but rather can be construed in breadth, spirit and scope in accordance with the appended claims.

What is claimed is:

1. A system, comprising:
a memory storing computer executable instructions components; and
a processor configured to execute the computer executable instructions stored in the memory that cause the processor to:
receive, from a user device, a request for first content;
determine a referral source webpage associated with the request for the first content, wherein the request for the first content originates from a first embedded content link provided on the referral source webpage;
in response to the request for the first content, directing the user device to a version of a content serving webpage for playback of the first content based on a determination of a device type corresponding to the user device that was employed to select the first embedded content link;
determine a set of context data for the request that includes information related to the context in which the request was made, wherein the set of context data includes a second embedded content link provided on the referral source webpage that is identified by the determination component crawling source code of the referral source webpage, the second embedded content link corresponding to second content different than the first content;
select a set of additional content that is different than first content and the second content based at least in part on a subset of context data including information identifying the second content corresponding to the second embedded content link and a set of consumption characteristics associated with presentation of the first content;
rank respective content in the set of additional content based at least in part on a set of ranking criteria; and
cause a subset of the additional content to be presented as suggested content on the content serving webpage, wherein the subset of the additional content that is presented to the user is selected from the set of additional content based at least in part on the ranking.

2. The system of claim 1, wherein the set of consumption characteristics includes at least one of a type of device employed to consume the content, and a set of devices associated with the user.

3. The system of claim 1, wherein the subset of the additional content are presented via a post-play section that is presented as part of the content serving webpage after presentation of the first content.

4. The system of claim 1, wherein the set of ranking criteria includes at least one of: a similarity score, a set of user preferences, or a set of collaborative filtering criteria.

5. A method, comprising:
employing a processor to execute computer executable instructions stored in memory to perform the following acts:
receiving, from a user device, a request for a first video;
determining a referral source associated with the request for the first video, wherein the request for the first video originates from a user selecting a first embedded video link provided on the referral source;
in response to the request for the first video, directing the user device to a version of a content serving webpage for playback of the first video based on a determination of a device type corresponding to the user device that was employed to select the first embedded video link;
identifying a second embedded video link provided on the referral source by crawling the referral source, the second embedded video link corresponding to a second video that is different than the first video requested by the user device;
identifying at least a third video that is different than the first video and the second video based at least in part on context data that includes information related to the context in which the request was made including information identifying the second video corresponding to the second embedded video link provided on the referral source; and
causing the third video to be presented as a recommendation via a post-play section that is presented as part of the content serving webpage after playback of the first video is complete based at least in part on a set of recommendation criteria, wherein user selection of the recommendation of the third video causes the user device to request the third video for playback.

6. The method of claim 5, further comprising determining the context data including determining at least one of an identity of a referral source, a type of referral source, a type of referral, or a set of consumption characteristics.

7. The method of claim 6, wherein determining the type of referral source includes determining the type of referral source as at least one of a search engine, an email, a webpage, a social network, an application, or a device.

8. The method of claim 6, wherein determining the set of consumption characteristics includes determining at least one of a type of device employed to consume the content, a set of devices associated with the user, a time of consumption, a geographic location of the user, a proximity to other devices, or a proximity to a set of other users.

9. The method of claim 5, wherein the set of recommendation criteria includes having a ranking satisfying a predetermined threshold.

10. A method, comprising:
employing a processor to execute computer executable instructions stored in memory to perform the following acts:
receiving, from a user device, a request for first content;
determining a referral source associated with the request for the first content, wherein the request for the first content originates from a first embedded content link provided on the referral source;
in response to the request for the first content, directing the user device to a version of a content serving webpage for playback of the first content based on a determination of a device type corresponding to the user device that was employed to select the first embedded content link;
determining a set of context data for the request that includes information related to the context in which the request was made, wherein the set of context data includes a second embedded content link provided on the referral source that is identified by crawling the referral source, the second embedded content link corresponding to second content different than the first content;
selecting a set of additional content that is different than first content and the second content based at least in part on a subset of context data including information identifying the second content corresponding to the second embedded content link and a set of consumption characteristics associated with presentation of the first content;
ranking respective content in the set of additional content based at least in part on a set of ranking criteria; and
causing a subset of the additional content to be presented as suggested content on the content serving webpage, wherein the subset of the additional content that is presented to the user is selected from the set of additional content based at least in part on the rankings.

11. The method of claim 10, wherein determining the set of context data includes determining at least one of an identity of a referral source, a type of referral source, a type of referral, or a set of consumption characteristics.

12. The method of claim 11, wherein determining the type of referral source includes determining the type of referral source as at least one of a search engine, an email, a webpage, a social network, an application, or a device.

13. The method of claim 11, wherein determining the type of referral includes determining the type of referral as at least one of a set of hyperlinks, a set of embedded content, or a set of search results.

14. The method of claim 11, wherein determining the set of consumption characteristics includes determining at least one of a type of device employed to consume the content, a set of devices associated with the user, a time of consumption, a geographic location of the user, a proximity to other devices, or a proximity to a set of other users.

15. The method of claim 10, wherein the set of ranking criteria includes at least one of: a similarity score, a set of user preferences, or a set of collaborative filtering criteria.

16. The system of claim 1, wherein the set of consumption characteristics includes at least one of a proximity to other devices, and a proximity to a set of other users.

17. The system of claim 1, wherein the set of consumption characteristics includes a time of consumption.

18. The system of claim 1, wherein the set of consumption characteristics includes a geographic location of the user.

19. The system of claim 1, wherein the crawling of the referral source occurs prior to the user consuming the content.

20. The system of claim 1, wherein the referral source identification component determines the referral source webpage based on session information associated with the request for content.

21. The method of claim 5, wherein the type of device employed to select the embedded video link includes one of a smart phone and a tablet, and the content serving webpage serves a mobile version of the webpage.

22. The method of claim 21, wherein the mobile version of the webpage includes playing the first video using an application installed on the smart phone or tablet and the post-play section recommends the third video within the application.

* * * * *